(12) United States Patent
Linder (10) Patent No.: US 11,246,297 B2
(45) Date of Patent: Feb. 15, 2022

(54) CONTAINER FOR A NUCLEUS HIVE OF BEES

(71) Applicant: Charles Linder, Flora, IL (US)

(72) Inventor: Charles Linder, Flora, IL (US)

(\*) Notice: Subject to any disclaimer, the term of this patent is extended or adjusted under 35 U.S.C. 154(b) by 0 days.

(21) Appl. No.: 16/728,689

(22) Filed: Dec. 27, 2019

(65) Prior Publication Data

US 2020/0205383 A1 Jul. 2, 2020

Related U.S. Application Data (60) Provisional application No. 62/785,629, filed on Dec. 27, 2018.

(51) Int. Cl.
*A01K 47/06* (2006.01)
*A01K 53/00* (2006.01)
*A01K 49/00* (2006.01)

(52) U.S. Cl.
CPC .............. *A01K 47/06* (2013.01); *A01K 49/00* (2013.01); *A01K 53/00* (2013.01)

(58) Field of Classification Search
CPC ........ A01K 47/00; A01K 47/02; A01K 47/04; A01K 47/06; A01K 49/00; A01K 53/00; B65D 21/0253; B65D 21/0217; B65D 21/02; B65D 21/04; B65D 21/0233; B65D 21/0234; B65D 21/0209
USPC ......... 449/39, 20, 24, 25, 11, 15, 27, 29, 30, 449/32, 34, 35, 42; 206/505, 503, 508, 206/507; 220/23.88, 23.86, 23.83, 23.87
See application file for complete search history.

(56) References Cited

U.S. PATENT DOCUMENTS

| | | | | |
|---|---|---|---|---|
| 103,166 A | * | 5/1870 | Frakes | A01K 47/00 449/26 |
| 1,056,783 A | * | 3/1913 | Enhelder | A01K 53/00 449/10 |
| 1,116,923 A | * | 11/1914 | Rahn | A01K 53/00 449/10 |
| 1,374,745 A | * | 4/1921 | Juriw | A01K 47/00 449/40 |
| 1,502,278 A | * | 7/1924 | Stevens | A01K 57/00 449/27 |
| 2,227,525 A | * | 1/1941 | Williams | A01K 47/06 449/24 |

(Continued)

FOREIGN PATENT DOCUMENTS

DE 2040242 A1 * 2/1972 ............ A01K 47/00
FR 2458215 A1 * 1/1981

*Primary Examiner* — Lisa L Tsang
(74) *Attorney, Agent, or Firm* — Martin IP Law Group; C. Richard Martin (57) ABSTRACT

A container for a nucleus hive of bees including a box having a polygonal shaped bottom and a plurality of side walls. Each one of the plurality of side walls extends upwardly from an edge of the polygonal shaped bottom. A side edge of each side wall is attached to a side edge of an adjacent side wall and upper edges of the side walls form an opening. The opening has an area larger than the area of the polygonal shaped bottom and a shape substantially corresponding to the polygonal shaped bottom. A hive frame support means is positioned on inner wall surfaces of a plurality of the side walls. A polygonal shaped removable lid is configured to rest upon and cover the opening. The box and lid are preferably formed from a rigid commodity grade plastic material.

15 Claims, 13 Drawing Sheets

(56) References Cited

U.S. PATENT DOCUMENTS

| | | | | |
|---|---|---|---|---|
| 2,340,219 A * | 1/1944 | Hawkins | A01K 47/00 | 449/35 |
| 2,446,346 A * | 8/1948 | Stoller | A01K 47/02 | 449/37 |
| 2,580,282 A * | 12/1951 | Colley | A01K 47/02 | 449/37 |
| 3,105,977 A * | 10/1963 | Root | A01K 47/00 | 449/33 |
| 3,110,044 A * | 11/1963 | Dullas | A01K 47/00 | 449/30 |
| 4,094,026 A * | 6/1978 | Simoni | A01K 47/00 | 449/21 |
| 4,524,476 A * | 6/1985 | Adams, IV | A01K 55/00 | 449/27 |
| 5,211,597 A * | 5/1993 | Scott | A01K 47/00 | 449/27 |
| 5,662,223 A * | 9/1997 | Sylegård | B65D 21/0217 | 206/508 |
| 5,741,170 A * | 4/1998 | Orletsky | A01K 47/00 | 449/30 |
| 5,895,310 A * | 4/1999 | Otomo | A01K 67/033 | 449/1 |
| 8,544,648 B2 * | 10/2013 | Cleveland | B65D 81/3823 | 206/508 |
| D834,315 S * | 11/2018 | Reinhart | D3/312 | |
| 2010/0108556 A1 * | 5/2010 | Claffy | B65D 25/04 | 206/508 |
| 2012/0295514 A1 * | 11/2012 | Keppens | A01K 47/06 | 449/13 |
| 2013/0199959 A1 * | 8/2013 | Parikh | B65D 21/045 | 206/507 |
| 2015/0140897 A1 | 5/2015 | Linder et al. | | |
| 2017/0135323 A1 * | 5/2017 | Gerogiannis | A01K 47/00 | |
| 2019/0069526 A1 * | 3/2019 | Pielemeier | A01K 47/02 | |
| 2019/0092524 A1 * | 3/2019 | Reinhart | B65D 21/0215 | |
| 2019/0320623 A1 * | 10/2019 | Sullivan | A01K 49/00 | |

\* cited by examiner

FIG. 13 ns to
maintain spacing or making them remotely stackable. Spac-
CONTAINER FOR A NUCLEUS HIVE OF BEES

BACKGROUND OF THE INVENTION

Field of the Invention

The present invention relates to containers for the storing and transporting of bees. More specifically, the present invention relates to an improved durable and stackable container for storing frames full of bees in a nucleus hive.

Description of the Related Art

Nucs, or nucleus colonies, are small honey bee colonies created from larger colonies. The term refers both to the smaller size box and the colony of honeybees within it. The name is derived from the fact that a nuc hive is centered on a queen, the nucleus of the honey bee colony. A nuc hive has all the features of a standard 10 frame Langstroth hive except with a reduced width. A typical nuc has 5 Langstroth frames arranged side-by-side. The nuc box is smaller because it is intended to contain a smaller number of honeybees, and a smaller space makes it easier for the bees to control the temperature and humidity of the colony, which is vital for brood rearing. When using a Langstroth hive, a nuc is created by pulling two to five frames from an existing colony. These frames and the nurse bees clinging to them form the basis for the nuc colony. A nuc consist of frames of bees that already have food, and brood started, as opposed to a package of bees, which is just bees alone. These are the 2 main ways people buy bees.

The market is currently served by 3 products. First, there are handmade wooden boxes, which tend to be expensive and very hard to ship economically, even when they are empty. In addition, the wooden boxes must be painted from time to time to extend their life. The second product currently in use is a corrugated plastic container that is shipped flat, but can be folded into a nuc box. This product is offered for sale as the EZ nuc from Jester. There are several disadvantages to this product as well—folding is difficult and time consuming, the frames do not fit tightly and precisely into the box, and they tend to hold rain water. In addition, the covers need to be taped closed or weighted due to the way the box is designed. Durability of this product is also a major concern. The third product that is currently available is a foldable cardboard box that is also shipped flat and can be folded into a nuc box. These products have the same issues as the EZ nuc and are even less durable, often lasting only a season or less. All of the prior art systems suffer from various issues such as bees leaking during transport, water intrusion, lids that don't stay shut, shipping and handling difficulties, and of course long term durability and/or maintenance.

The current containers also suffer from shipping issues when full of bees. None of the boxes have any provisions to maintain spacing or making them remotely stackable. Spacing of boxes full of bees is very important as bees are exothermic, and have a habit of rapidly overheating when excited, such as in transportation. The current containers do not provide for airflow around the boxes during transit. While the wooden boxes are strong, the plastic folded boxes and cardboard have little to no structural strength and require additional support for stacking.

Accordingly, there is a need for a simple inexpensive box to allow beekeepers to sell what is referred to as a nucleus hive. There is a need for a nuc box that is durable and stackable for easy storage and shipping. There is a further need for a nuc box that is low enough cost to be considered disposable, yet tough enough to be reusable. There is also a need for a nuc box where the frames can be quickly and easily inserted and removed and where the frames are properly positioned. There is also a need for a nuc box that allows rainwater to drain, allows for air to circulate and has other features that are beneficial.

SUMMARY OF THE INVENTION

It is therefore an object of the present invention to provide a container for a nucleus hive of bees that is durable and stackable for storage.

It is also an object of the invention to provide a container for a nucleus hive of bees where the frames can be easily accessed for removal and replacement.

A further object of the invention is to provide a container for a nucleus hive of bees with improved air flow and/or venting to prevent overheating of the hive during transportation.

Yet another object of the invention is to provide a container for a nucleus hive of bees where the frames are secured against significant movement while in the container and set at optimal spacing within the container for bee activity.

Another objective of the invention is to provide a container for a nucleus hive of bees where rainwater can be easily drained from the container.

The present invention meets these objects by providing a container for a nucleus hive of bees having a box and lid formed of durable plastic material. The walls of the box are slanted such that a plurality of boxes can be nested within one another for storage or shipping. Removable rails are provided for holding the frames in place with little or no room for movement. The rails are removed and stored in the bottom of the container for shipping and/or storage.

The box has a flange at the open top end thereof, and a lower, flat area is provided in the portion of the flange above the end walls to provide easy access to the ends of the frames for removal. In addition, adequate space is provided below the frames (¾ of an inch) to prevent crushing bees on the bottom. Space on top of the frames is also provided for feeding of pollen patties to growing hives.

Drain holes are provided in the bottom of the box to allow any moisture to drain out quickly. The holes are small enough to not allow bees to escape. At the bottom of the box, the size is such as to fit five frames with only ¼" of space to prevent the frames from banging around and shifting and crushing bees during transit. The frames are restricted on both sides and the ends from shifting.

A unique sliding door is also provided in each end wall of the box to allow air to circulate when the door is closed for transport, or to allow bees to enter and exit the box when the container is being used. The door itself is designed to be slid upwards to open. It is placed between two vertical legs set on an angle. When slid upwards it forces the door to flex along living hinges and form a trapezoid that sticks outward. This provides a "porch" or rain shield to stop water intrusion. The upper portion is screened, and while it's up its protected from rain by the lip of the box. The downward side is forced out ward roughly ¾ of an inch to allow bees to fly up under it to enter the hive. In the down position, the door provides a screened closure for the opening. This allows air flow, and restricts bees for transport. The door has a feature at the top of the tote to latch it into the open position, using the flex of the door as a spring, as well as a feature on the door itself to secure it in the downward position.

The lid and flange of the box are provided with a plurality of corresponding pegs and holes, respectively, that, when aligned help to close the lid on the box tightly. When the lid is rotated 180 degrees, the pegs and holes are not in alignment, thereby creating an air gap providing further ventilation to the container. Snaps on the end allow the lid to lock exactly the same either way. The lid also has two areas to feed bees. One is designed for pop bottles; the other is for one gallon can feeders which are common in some parts of the country. The lid is also designed with a detail on it to allow stacking without the boxes shifting around. A nesting detail is important to travel.

In the bottom of the boxes are four details which prevent binding of the boxes in the stacked position. When the doors are installed, it adds a thickness to the box, which cause boxes to bind if stacked when assembled. To overcome this, offset ribs in the sidewalls are provide which increase the stacked and nested heights in order to solve the issue, but still allow for compressed storage.

According to one presently preferred embodiment of the invention, there is provided a container for a nucleus hive of bees comprising a box having a polygonal shaped bottom and a plurality of side walls. Each one of the plurality of side walls extends upwardly from an edge of the polygonal shaped bottom. A side edge of each side wall is attached to a side edge of an adjacent side wall and upper edges of the side walls form an opening. The opening has an area larger than the area of the polygonal shaped bottom and a shape substantially corresponding to the polygonal shaped bottom. A hive frame support means is positioned on inner wall surfaces of a plurality of the side walls. A polygonal shaped removable lid is configured to rest upon and cover the opening. The box and lid are preferably formed from a rigid commodity grade plastic material.

The hive frame support means preferably includes a pair of opposing slots formed on the inner surface of opposing side walls; and a pair of frame rests, the ends of which are removably positioned in the opposing slots such that the pairs of slots are spaced a distance apart to accommodate the hanging of a plurality of frames on and between the pair of frame rests. A flange surrounding the opening at the upper edges of the plurality of side walls may be provided. A pair of recesses may be formed in the flange on opposing ends proximate to the pairs of slots to allow easy access to the frames inside.

A bee entrance may located in a first one of the plurality of side walls. The bee entrance comprises an opening in the first side wall and a sliding door positioned between two upright converging legs formed in the first side wall. The door is formed from a semi-rigid plastic material and includes a main face and two outer wings attached to the main face by living hinges. A vent may also be provided in the main face of the door. A second bee entrance may be positioned in a second one of the plurality of side walls opposite the first one of the plurality of side walls. According to one preferred embodiment of the invention, the box has four walls and is rectangular shaped with the first and second bee entrances being positioned in opposing end walls of the box.

The lid may be provided with a recess in the upper surface thereof, the dimensions of the recess approximating the dimensions of the bottom of the box. A plurality of flat areas may be provided in the top of the lid in communication with the recess at a first end and open at a second end to allow water to run off. A plurality of evenly space holes in the flange and a corresponding number of evenly spaced pegs formed in a lower surface of the lid about the periphery may also be provided. The pegs are formed in the lid such that in a first orientation of the lid relative to the box, the pegs align with and can be inserted into the corresponding holes in the flange, and in a second orientation of the lid relative to the box, the pegs align with the spaces between said holes in the flange providing an air gap between the lid and the flange. The lid may further include one or more feeding ports located in the surface of the lid.

Means for removably fastening the lid onto the box may also be provided. The fastening means includes a first snapping mechanism located in a first edge of the lid; a second snapping mechanism located in a second edge of the lid; a first stepped tab mechanism located in the flange of the box above a first sidewall of the box; and a second stepped tab mechanism located in the flange of the box above a second sidewall of the box. The first and second snapping mechanism and first and second stepped tab mechanism are oriented such that in a first orientation the first snapping mechanism aligns with and engages the first stepped tab mechanism and the second snapping mechanism aligns with and engages the second snapping mechanism; and in a second orientation first snapping mechanism aligns with and engages the second stepped tab mechanism and the second snapping mechanism aligns with and engages the first snapping mechanism.

A first plurality of inwardly projecting ribs formed in a first group of side walls of the box and projecting a distance upwardly from the lower edge of the side wall, and a second plurality of inwardly projecting ribs formed in a second group of side walls of the box and projecting a distance upwardly from the lower edge of the side wall, said first and second pluralities of inwardly projecting ribs being offset from one another such that in a first nesting orientation of a pair of boxes, the ribs of each box align with one another to allow a top box to fully nest within a bottom box, and in a second nesting orientation of a pair of boxes, the ribs of each box mis-align with one another to allow a top box to only partially nest within a bottom box.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 12:
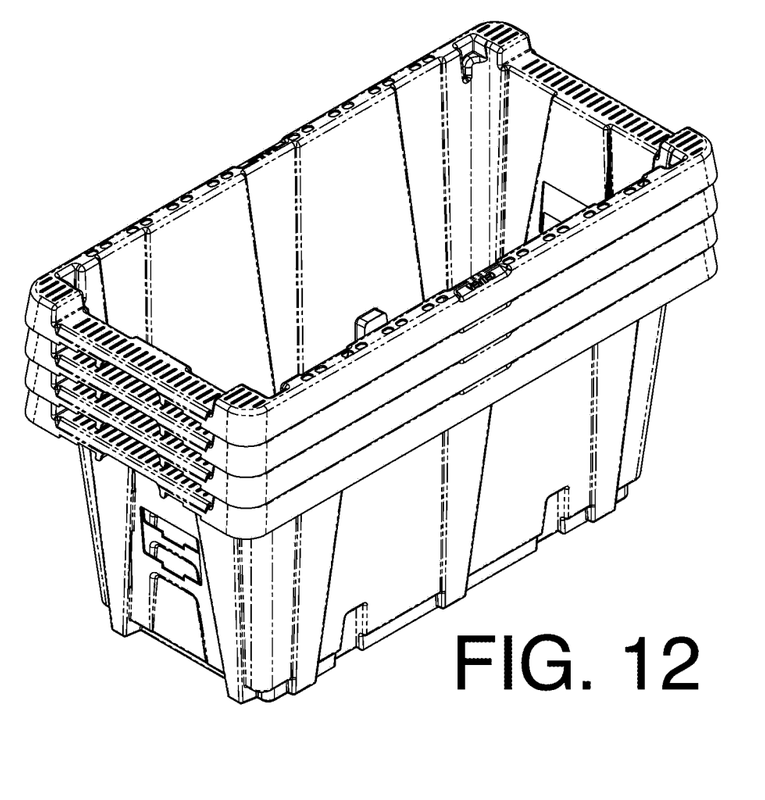
FIG. 12 is a perspective view of four improved containers for nucleus hive shown in FIG. 1 shown here in a first nested configuration for storage and/or shipping and with the doors not present.

As best shown in the drawings, including FIG. 1-FIG. 5, one presently preferred embodiment of the invention comprises an improved nucleus hive container 10 includes a box 20 having four walls 21a, 21b, 21c, 21d and a bottom 22 with an opening at the top for inserting and removing a plurality of hive frames 30a, 30b, 30c, 30d, 30e. A removable lid 40 is also provided. The box 20 and lid 40 may preferably be formed from a rigid commodity grade plastic material such as polypropylene or low-density polyethylene (LDPE). The interior of the side walls 21a, 21c are provided with slots 23a, 23b, 23c, 23d at the respective ends thereof for receiving removable frame rests 50a, 50b which, in operation, support the ends of the plurality of frames 30a, 30b, 30c, 30d, 30e. The frame rests 50a, 50b can be formed of any material and are designed to friction fit in the slots 23a, 23b, 23c, 23d to minimize movement of loose frames, and be sturdy enough to support the weight of five frames. This is critical as bees are very fussy about extra space, and providing the wrong bee space will lead to problems with excess burr comb and handling. Too much space will also allow the frames 30a, 30b, 30c, 30d, 30e to move around in transport and kill bees by crushing. This detail allows for a draft angle to minimize stacking height. In one specific, preferred embodiment, a 5 degree draft angle is provides which allows a nested height of very close to 1" when the boxes 20 are nested as shown in FIG. 12, which allows for maximum density in shipping and storage. When the container 10 is not in use and the boxes are stacked as in FIG. 12 or FIG. 13, the frame rests 50a, 50b can be removed and stored in the bottom of the box 20.

The box 20 further includes a flange 24 at the upper end of the walls 21a, 21b, 21c, 21d at the top opening. At the portions of the flange 24 above the end walls 21b, 21d, recesses 25a, 25b are provided. The recesses 25a, 25b allow for easy access to the ends of the frames 30a, 30b, 30c, 30d, 30e for removal.

Figure 8:
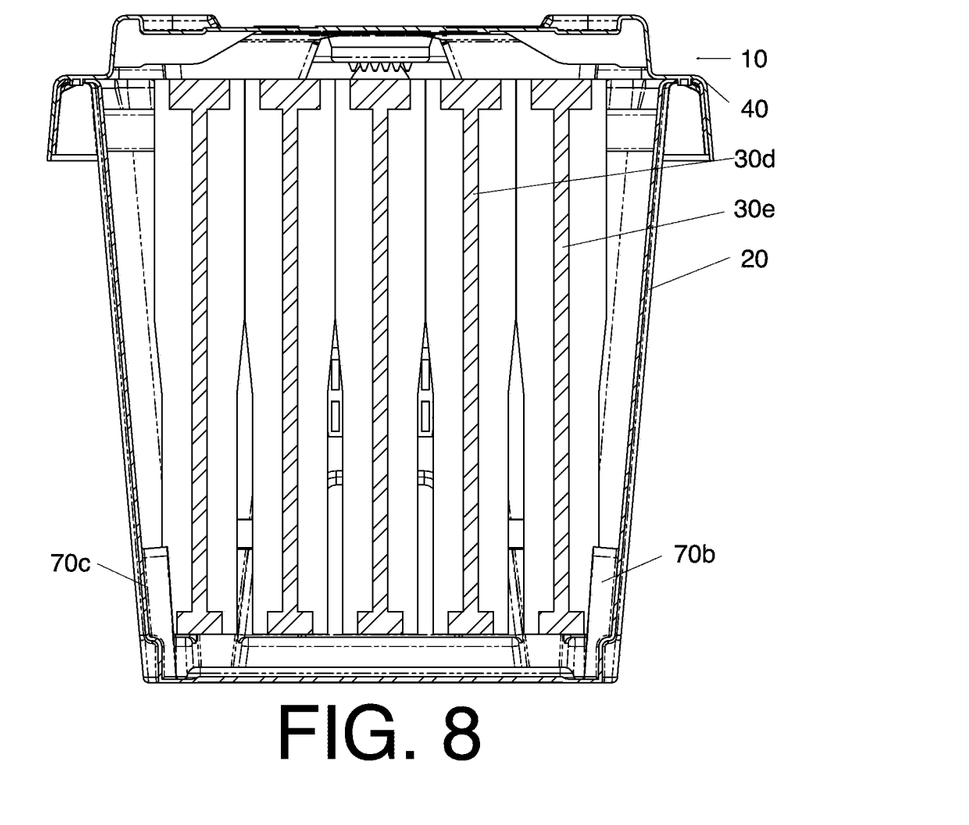
FIG. 8 is an end sectional view of the improved container for nucleus hive shown in FIG. 1 with the frames inserted in the box.

As best shown in FIG. 8, space is provided between bottoms of the frames 30a, 30b, 30c, 30d, 30e and the bottom 22 of the box 20 to prevent crushing bees on the bottom. Preferably the spacing is approximately ¾". Space is also provided above the frames for feeding of pollen patties to growing hives. A plurality of drain holes 26 are provided in the box bottom 22 to allow any moisture to drain out quickly. The holes 26 are small enough to not allow bees to escape. Also as best shown in FIG. 8, the width of the box 20 near the bottom 22 thereof is such as to fit five frames 30a, 30b, 30c, 30d, 30e with only ¼" of space. This prevents the frames from banging around and shifting, thereby crushing bees during transit. The frames are restricted on both sides and the ends from shifting.

Figure 6:
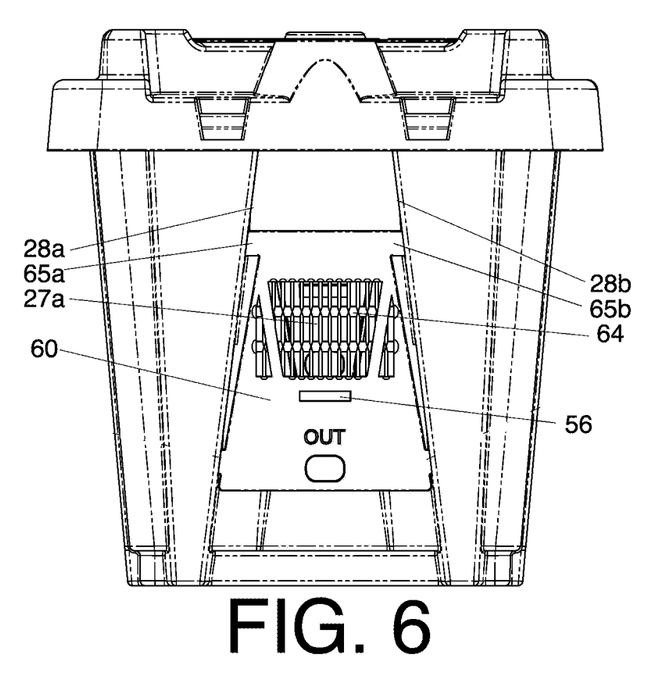
FIG. 6 is an end plan view of the improved container for a nucleus hive shown in FIG. 1 with the door shown in the down/closed position.
Figure 7:
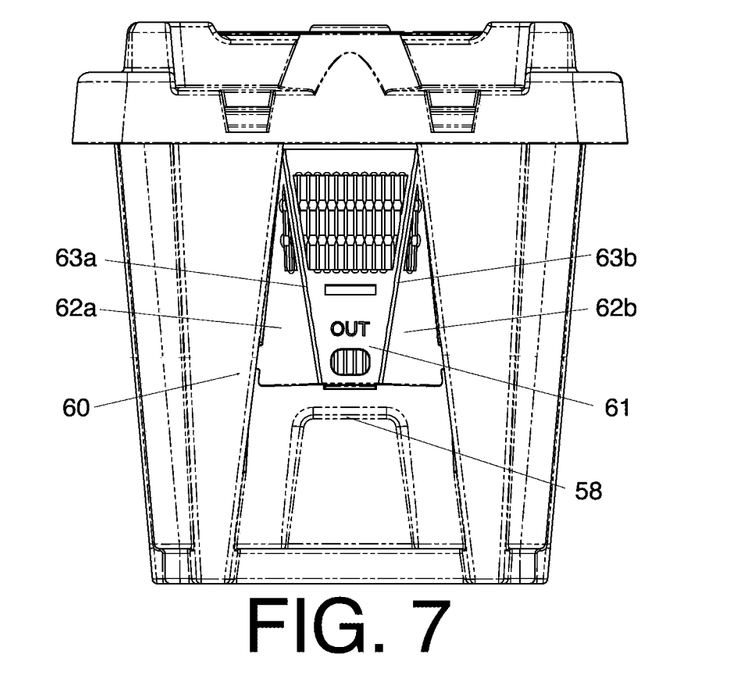
FIG. 7 is an end plan view of the improved container for a nucleus hive shown in FIG. 1 with the door shown in the up/open position.

As best shown in FIG. 6 and FIG. 7, each end wall 21b, 21d may include an opening 27a, 27b therein for bees to enter and exit the container 10. In prior art devices, the entrance opening was located at or near the bottom of the box. However, in the present invention, the entrance openings 27a, 27b have been moved up off the ground to help with skunk problems as well as to accommodate sliding doors 60. The entrance size is very large and on both ends to allow for cross ventilation of the hive, a feature which is further enhanced by having the openings located higher up in the end walls 21b, 21d of the box 20, toward the top of the hive. Each of the doors 60 is designed to be slid upwards to open. The door is also formed from a semi-rigid plastic material and includes a main face 61 and two outer wings 62a, 62b attached to the main face 61 by living hinges 63a, 63b. A screen or vent 64 is located in an upper area of the main face 61 of the door 60. The door 60 is placed between two vertical legs 28a, 28b set on an angle and formed in the end walls 21b, 21d of the box 20. When in the closed position as shown in FIG. 6, the door lays flat against the end wall 21a and the vent 64 is aligned with the opening 27a to allow air to circulate through the box 20 while keeping the bees safely inside for transport. When slid upwards as shown in FIG. 7, the two vertical legs 28a, 28b force the door 60 to flex along living hinges 63a, 63b and form a trapezoid that sticks outward. This provides a "porch" or rain shield to stop water intrusion. When in the open position as shown in FIG. 7, the downward side of the door 60 is forced outward a small distance (roughly ¾ of an inch according to one presently preferred embodiment) to allow bees to fly up under it to enter the hive. The door has a feature at the top of the tote to latch it into the open position, using the flex of the door as a spring, as well as a feature on the door itself to secure it in the downward position. These features may be in the form of notches that are provided in the vertical legs 28a, 28b which engage projections 65a, 65b near the upper edge of the door. These notches are located in the vertical legs at positions that correspond to the locations of the projections 64a, 64b in the open position (FIG. 7) to hold the door open. An inward projection 56 on the door 60 engages an upper edge of an indentation 58 in the box 20 to hold the door in the closed position.

Figure 1:
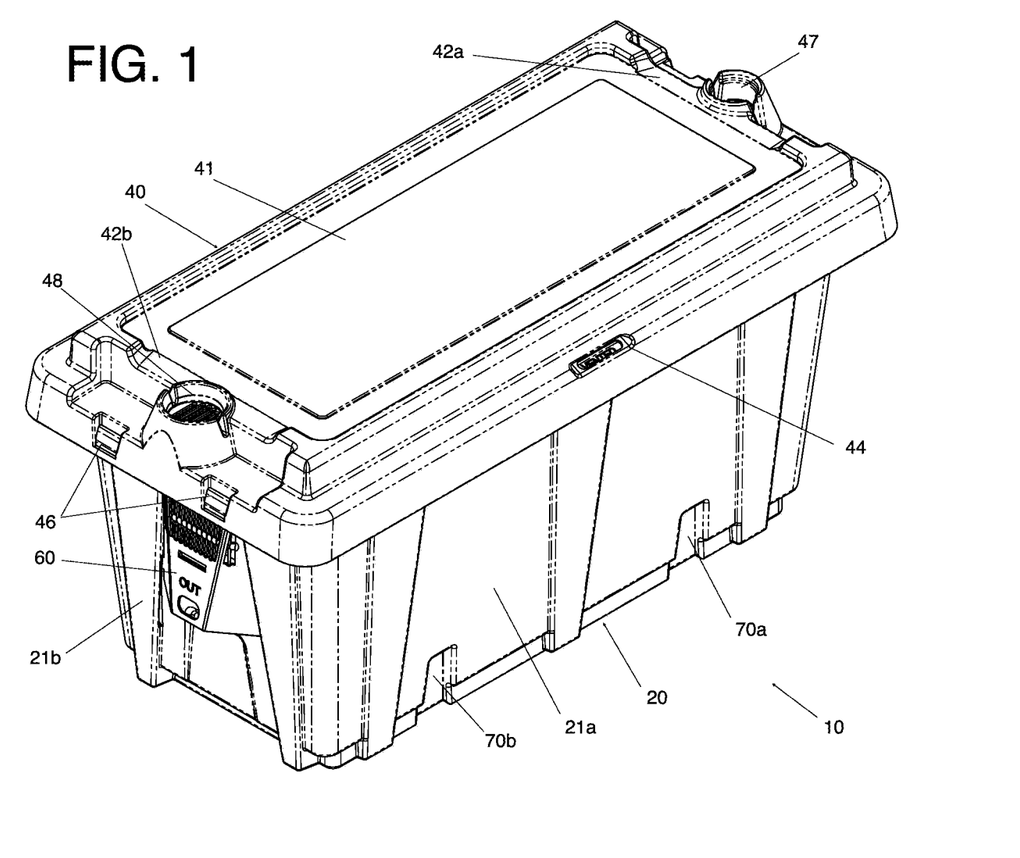
FIG. 1 is a top side perspective view of an improved container for a nucleus hive of bees according to a presently preferred embodiment of the invention.
Figure 2:
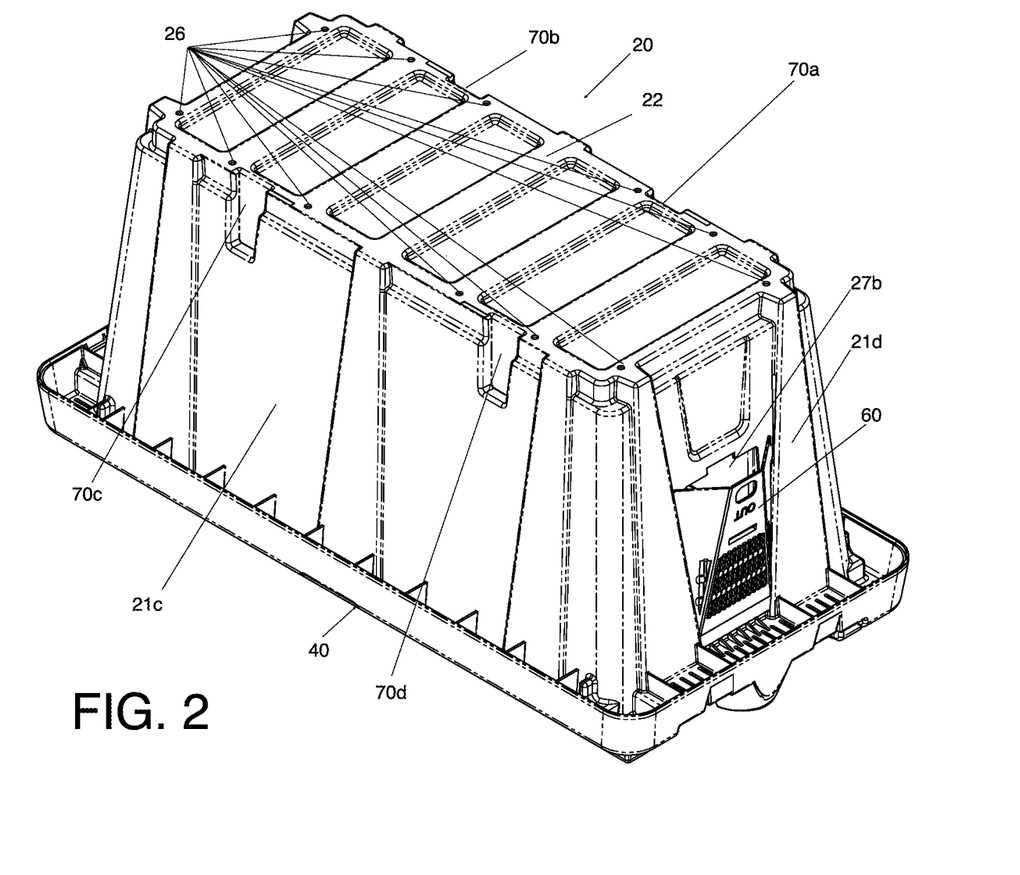
FIG. 2 is a bottom side perspective view of the improved container for a nucleus hive shown in FIG. 1.
Figure 3:
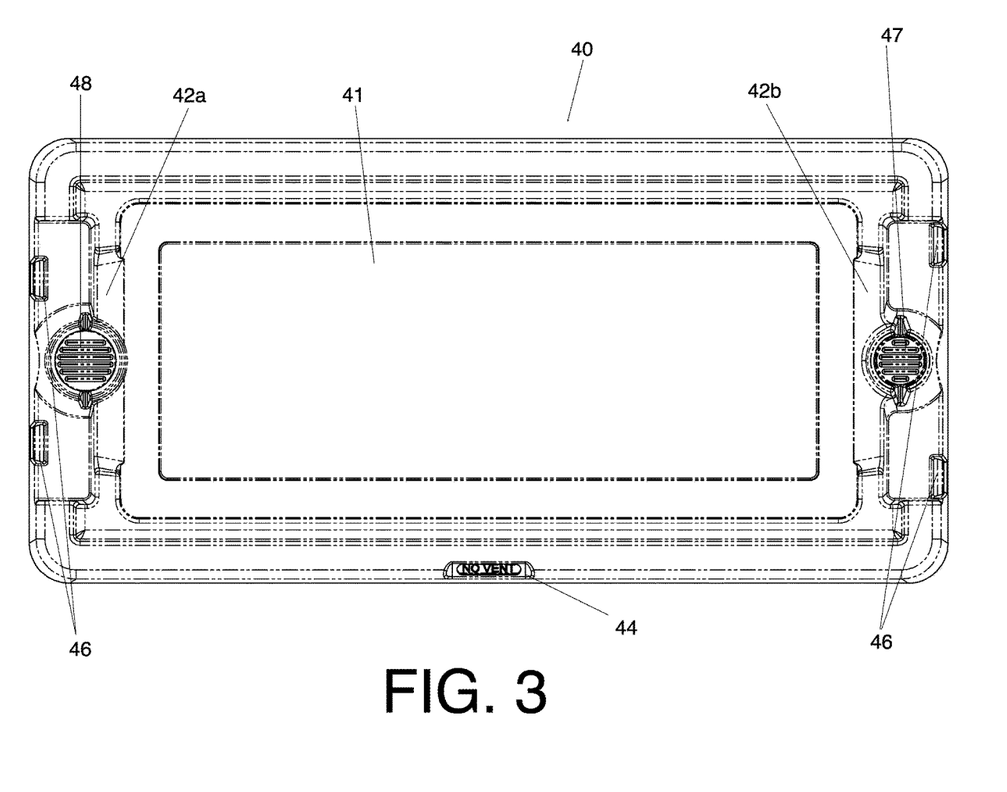
FIG. 3 is a top plan view of the improved container for a nucleus hive shown in FIG. 1.
Figure 4:
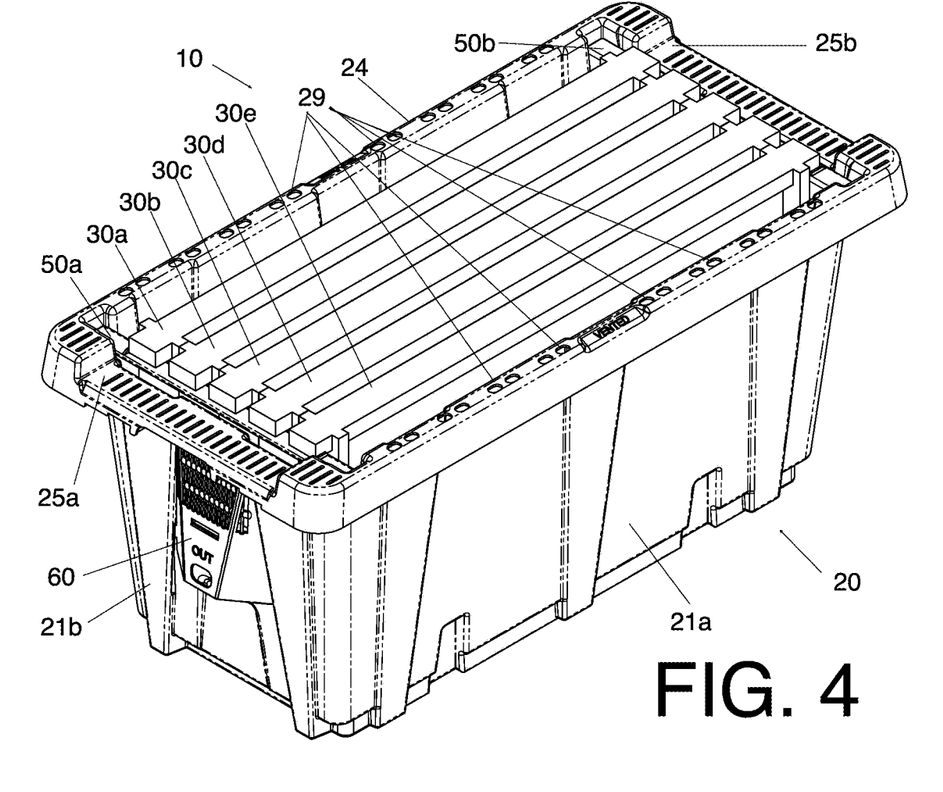
FIG. 4 is a top side perspective view of the improved container for a nucleus hive shown in in FIG. 1, shown here with the lid removed and the frames inserted in the box.
Figure 11:
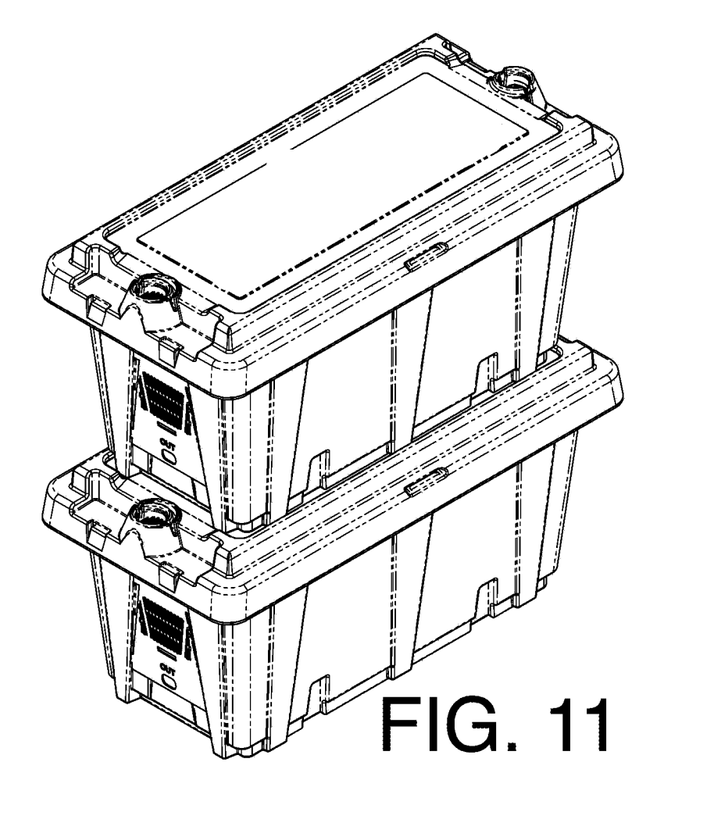
FIG. 11 is a perspective view of two improved containers for nucleus hive shown in FIG. 1 shown stacked one atop the other.

As best shown in FIG. 1 and FIG. 2, the lid 40 is designed to shed water thereby leaving no areas to allow water to pool. In this regard, the lid 40 includes a recessed area 41 which is sized to accept the bottom of another box 20 as shown in FIG. 11 allowing assembled containers 10 to be stacked such that they are secured from sliding relative to one another. Flat areas 42a, 42b are located at the ends of the recessed area to allow water to run off.

When installed, the lid 40 overlaps the flange 24 on the box 20 to provide an extra stiff flange assembly, as well as prevent bee escapes in both the vented (FIG. 10A and FIG. 10B) and non-vented (FIG. 9A and FIG. 9B) positions. The lid 40 is designed to be reversed from a non-vented position to prevent rain intrusion and a vented position. In FIG. 1, the lid 40 is shown installed in the vented position. The word "VENTED" or some other indication that the box is set up in the vented configuration, is stamped in the top of the flange 24 in the first side wall 21a, and an opening or window 44 is located along the side edge of the lid 40 such that it lines up with the "VENTED" wording in the flange 24 when the lid 40 is installed in the vented position. Similarly, the word "NO VENT" is stamped in the top of the flange 24 in the second side wall 21c, such that when the lid is turned 180 degrees, the window 44 aligns with the words "NO VENT".

Figure 5:
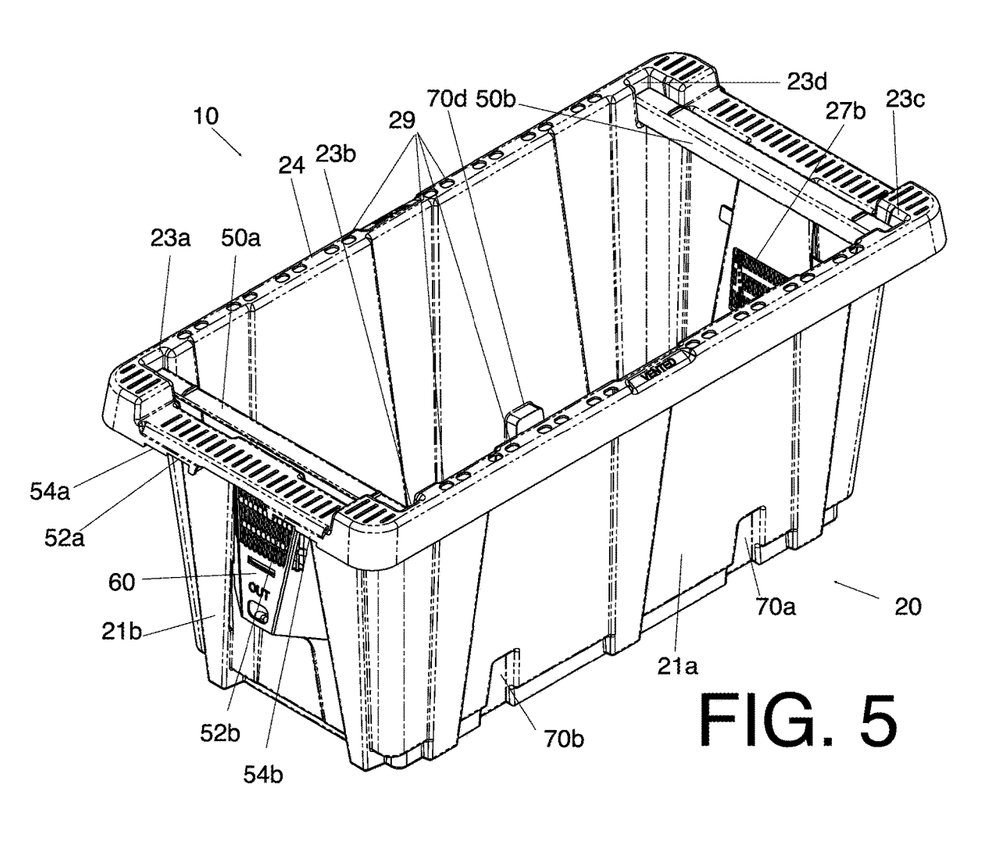
FIG. 5 is a top side perspective view of the improved container for a nucleus hive shown in in FIG. 1, shown here with the lid removed and no frames in the box.
Figure 9A:
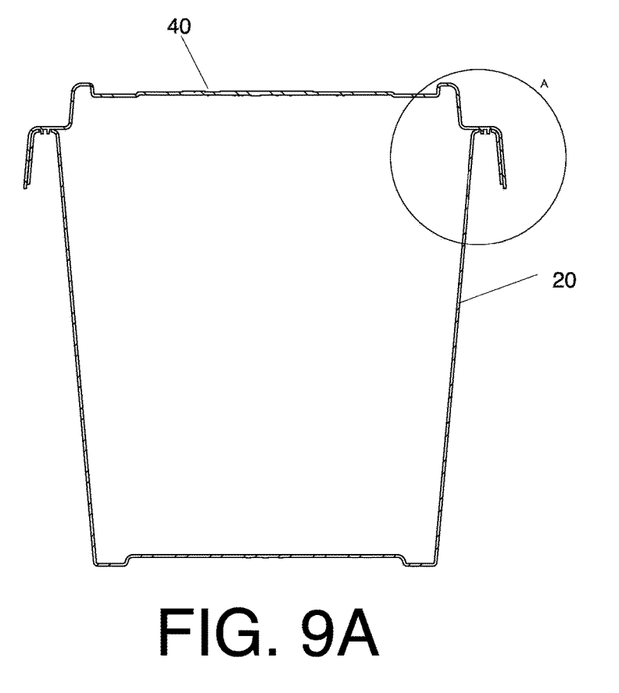
FIG. 9A is a sectional view of the improved container for nucleus hive shown in FIG. 1 with the lid installed on the container in the non-vented configuration.
Figure 9B:
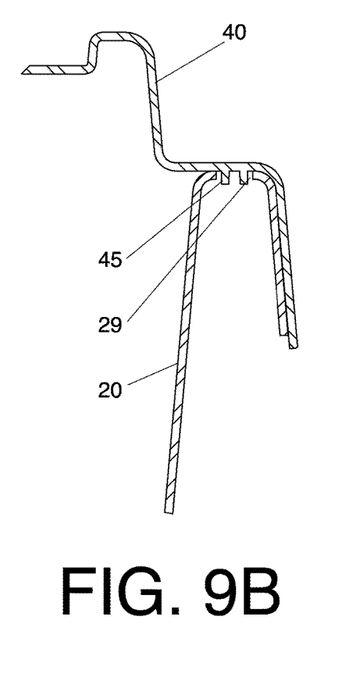
FIG. 9B is a detailed view of the area indicated by the circle A in FIG. 9A.
Figure 10A:
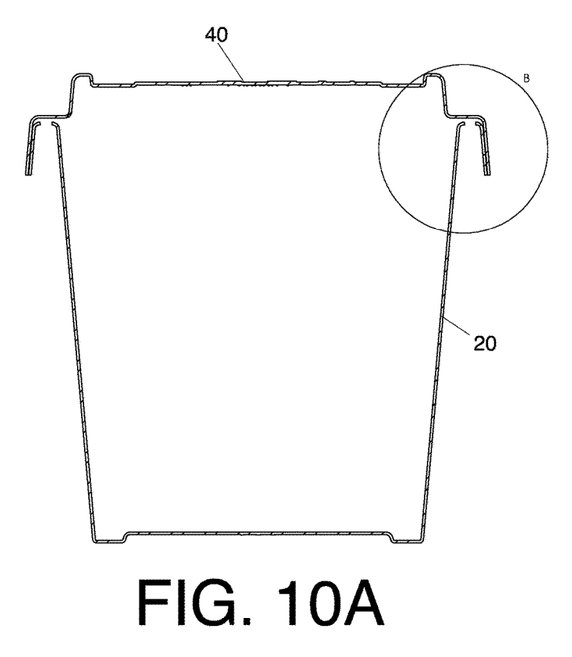
FIG. 10A is a sectional view of the improved container for nucleus hive shown in FIG. 1 with the lid installed on the container in the vented configuration.
Figure 10B:
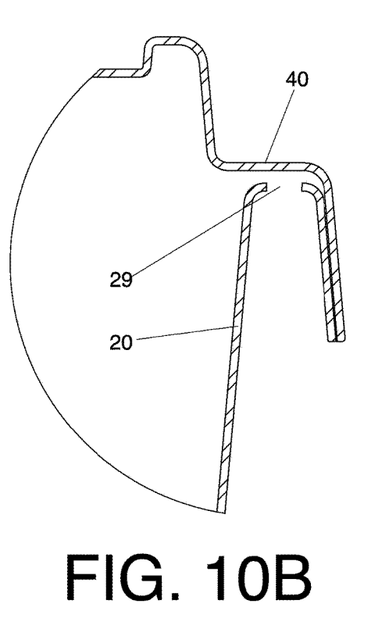
FIG. 10B is a detailed view of the area indicated by the circle B in FIG. 10A.

As best shown in FIG. 9A and FIG. 9B, when the lid 40 is installed in the non-vented position, a plurality of pegs 45 that correspond to a corresponding plurality of holes 29 in the flange 24 are aligned and drop into the holes 29 allowing the lid to be closed tightly and sealed. Similarly, as best shown in FIG. 10A and FIG. 10B, when the lid is installed in the vented direction, the pegs 45 do not align with the holes 29 and rest on the flange 24 elevating the lid 40 above the flange 24 keeping the lid 40 from closing all the way and providing an air gap to allow heat to escape through the holes 29 and/or longer holes provided in the ends of the flange. Snaps 46 may also be provided on the ends of the lid 40 to allow the lid to lock on to the box regardless of whether it is in the vented or not vented orientation. As best shown in FIG. 5, the snaps 46 on one end of the lid 40 are spaced apart to align with corresponding stepped tabs 52a, 52b in the flange 24 of the box 20, while the snaps 46 at the other end of the lid 40 are spaced apart to align with corresponding stepped tabs 54a, 54b. The stepped tabs 52a, 52b are at a different height than the stepped tabs 54a, 54b, such that, regardless of the height of the lid 40 above the flange 24 due to being in the vented or non-vented orientation, the snaps 46 line up at each end with either tabs 52a, 52b or tabs 54a, 54b so that the lid 40 is locked onto the box 20. The holes 29 allow airflow, but not bee passage when the lid 40 is in the vented position, permitting increased airflow within the container 10. The sides are still drafted as such as to maintain a ½" overlap so that bees cannot escape in any form. The width of the flange 24 on the top, the holes 29 in the flange, and the taper provide for constant airflow between and around the boxes, even when stacked together on pallets.

The lid 40 also includes two areas to feed bees. A first feeding port 47 is designed to accommodate the mouth of a standard soda pop bottle, while a second feeding port 48 is designed to accept a one gallon can feeder which is commonly used in some parts of the country. The feeding ports 47, 48 are molded closed, but at the customer's choice they are quickly opened with a utility knife to allow usage. The design of these feeding ports is such that it won't hold rainwater and even if opened it does not allow bees to escape.

Figure 13:
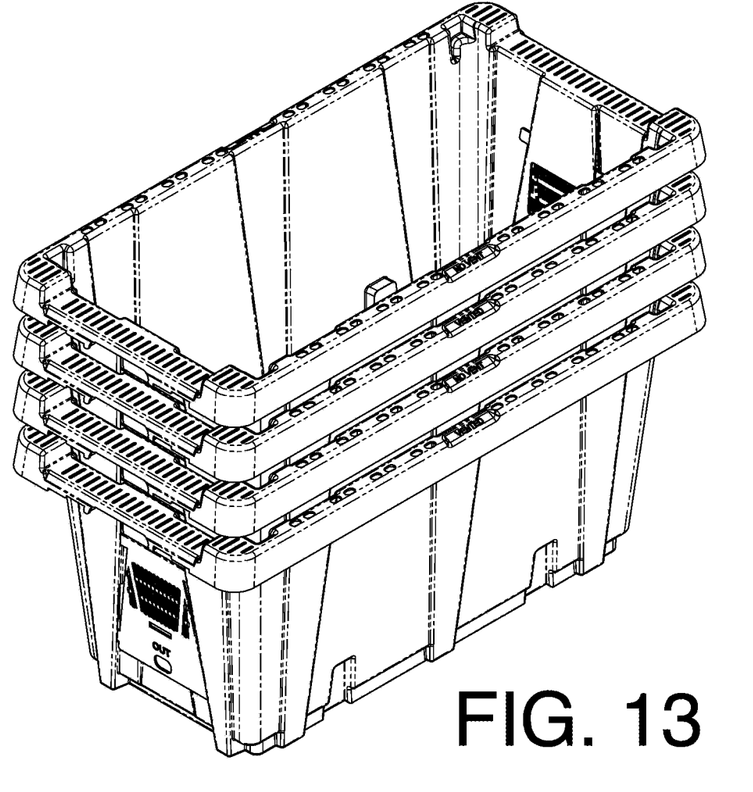
FIG. 13 is a perspective view of four improved containers for nucleus hive shown in FIG. 1 shown here in a second, alternative nested configuration for storage and/or shipping and with the doors installed.

When the doors 60 are installed, it adds a thickness to the container 10, even when the doors 60 are in the closed position. This increased thickness may cause the boxes 20 to bind if stacked in the traditional manner for shipping as shown in FIG. 12. A first pair of inwardly projecting ribs 70a, 70b are provided in the side wall 21a of the box 20 near the bottom 22. A second pair of inwardly projecting ribs 70c, 70d are provided in the opposing side wall 21c of the box 20 near the bottom 22. The second pair of ribs 70c, 70d are offset from the first pair of ribs and do not align with them. Thus, where multiple boxes 20 are nested with first sidewalls 21a having the first pair of inwardly projecting ribs 70a, 70b in alignment with one another, the ribs from one box to the next align allowing the boxes to fully nest as shown in FIG. 12. However, when boxes are stacked in an alternating alignment, i.e. second sidewall 23c of the upper box aligned with first sidewall 21a of the lower box, the ribs do not align, causing the bottom of the top box to rest upon the ribs 70a, 70b, 70c, 70d of the lower box. This increases the stacked and nested heights as shown in FIG. 13 in order to solve the issue of sticking doors, while still allowing for compact storage of nested boxes.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A container for a nucleus hive of bees comprising:
a box having a polygonal shaped bottom and a plurality of side walls, each one of said plurality of side walls extending upwardly from an edge of the polygonal shaped bottom; a side edge of each of the side walls attached to a side edge of an adjacent one of said side walls and upper edges of all of the plurality of side walls forming an opening, said opening having an area larger than the area of the polygonal shaped bottom and a shape substantially corresponding to the polygonal shaped bottom;
a first removable frame rest having a first end and a second end, the first end removably engaging a first slot formed on an inner surface of a first one of said side walls, and the second end removably engaging a second slot formed on an inner surface of a second one of said side walls, said second one of said side walls being on an opposite side of the nucleus hive container relative to the first one of said side walls and said second slot being aligned with said first slot;
a second removable frame rest having a first end and a second end, the first end removably engaging a third slot formed on an inner surface of the first one of said side walls, and the second end removably engaging a fourth slot formed on an inner surface of the second one of said side walls, and said fourth slot being aligned with said third slot;
said first and second removable frame rests, when positioned in the respective slots, being spaced a distance apart to accommodate the hanging of a plurality of frames on and between the first and second removable frame rests; and
a polygonal shaped removable lid configured to rest upon and cover said opening.

2. The nucleus hive container according to claim 1 wherein said box is formed from a rigid commodity grade plastic material.

3. The nucleus hive container according to claim 2 wherein said lid is formed from a rigid commodity grade plastic material.

4. The nucleus hive container according to claim 1 further comprising a flange surrounding the opening at the upper edges of said plurality of side walls, and a pair of recesses formed in said flange on opposing ends of the opening proximate to said pairs of slots.

5. The nucleus hive container according to claim 4 further comprising a plurality of evenly spaced holes in the flange and a corresponding number of evenly spaced pegs formed in a lower surface of the lid about a periphery of the lid.

6. The nucleus hive container according to claim 5 wherein the pegs are formed in the lid such that in a first orientation of the lid relative to the box, the pegs align with and can be inserted into the corresponding holes in the flange, and in a second orientation of the lid relative to the box, the pegs align with a plurality of spaces between said holes in said flange to provide an air gap between the lid and the flange.

7. The nucleus hive container according to claim 6 further comprising:
- a first snapping mechanism located in a first edge of the lid;
- a second snapping mechanism located in a second edge of the lid;
- wherein the first and second snapping mechanisms releasably engage the flange surrounding the opening of the box to lock the lid onto the box.

8. The nucleus hive container according to claim 1 wherein the lid has a recess in an upper surface thereof, the dimensions of the recess approximating the dimensions of the bottom of the box.

9. The nucleus hive container according to claim 8 further comprising a plurality of flat areas in the lid, each of said plurality of flat areas having a first end in communication with the recess and a second open end to allow water to run off.

10. The nucleus hive container according to claim 1 wherein the lid further includes one or more feeding ports located in a surface of the lid.

11. The nucleus hive container according to claim 1 further comprising a first plurality of inwardly projecting ribs formed in a first group of said plurality of side walls of the box and projecting a distance upwardly from a lower edge of each of said plurality of side walls, and a second plurality of inwardly projecting ribs formed in a second group of said plurality of side walls of the box and projecting a distance upwardly from a lower edge of each of said plurality of side walls, said first and second pluralities of inwardly projecting ribs being offset from one another.

12. A container for a nucleus hive of bees comprising:
- a box having a polygonal shaped bottom and a plurality of side walls, each one of said plurality of side walls extending upwardly from an edge of the polygonal shaped bottom; a side edge of each of the side walls attached to a side edge of an adjacent one of said side walls and upper edges of all of the plurality of side walls forming an opening;
- hive frame support means positioned on inner wall surfaces of two or more of the plurality of side walls;
- a polygonal shaped removable lid configured to rest upon and cover said opening;
- a bee entrance opening positioned in a first one of said plurality of side walls; and
- a door having a main face and two outer wings attached to the main face by living hinges, said door slidably disposed between two upright converging legs formed in said first one of said plurality of side walls; wherein the door blocks substantially the entire opening when in a closed position, and when the door is in an open position, the two outer wings flex along the living hinges to form the door into an outwardly projecting trapezoid.

13. The nucleus hive container according to claim 12 further comprising a vent in the main face of the door.

14. The nucleus hive container according to claim 12 further comprising a second bee entrance positioned in a second one of said plurality of side walls opposite said first one of said plurality of side walls.

15. The nucleus hive container according to claim 14 wherein said plurality of side walls includes first and second opposing side walls and first and second opposing end walls, and the box is rectangular shaped with the first and second bee entrances being positioned in said first and second opposing end walls, respectively.

* * * * *